United States Patent [19]

Cavanna

[11] Patent Number: 4,502,846

[45] Date of Patent: Mar. 5, 1985

[54] APPARATUS FOR TRANSFERRING FLUID

[75] Inventor: Cesar E. Cavanna, Livermore, Calif.

[73] Assignee: Richmond Lox Equipment Company, Livermore, Calif.

[21] Appl. No.: 241,541

[22] Filed: Mar. 9, 1981

[51] Int. Cl.³ .......................... F04B 17/00; F16M 7/00
[52] U.S. Cl. .................................... 417/362; 474/114; 248/657
[58] Field of Search .......................... 417/362; 474/114; 248/656, 657, 655, 651; 384/192, 247, 252, 253, 257, 260

[56] References Cited

U.S. PATENT DOCUMENTS

| 1,114,022 | 10/1914 | Olbrantz | 384/260 |
| 2,139,113 | 12/1938 | Cline et al. | 474/114 X |
| 3,753,542 | 8/1973 | Sloyan | 474/114 X |
| 4,269,573 | 5/1981 | Goode | 417/362 |

Primary Examiner—Richard E. Gluck
Assistant Examiner—Peter M. Cuomo
Attorney, Agent, or Firm—Bielen and Peterson

[57] ABSTRACT

An apparatus for transferring fluid in relation to a container which includes a motor having a driven rotating shaft. A pump driven by another shaft is also included. Work is transmitted from the driving motor shaft to the driven pump shaft by a linkage such as a fan belt. An adjustment mechanism determines the distance between the two shafts.

9 Claims, 3 Drawing Figures

APPARATUS FOR TRANSFERRING FLUID

BACKGROUND OF THE INVENTION

The present invention relates to an apparatus for transferring fluids which is especially useful for loading and emptying trailers, barges, and stationery storage containers.

The unloading or loading of a cryogenic container must be accomplished safely, quickly, and efficiently. Prior devices of this nature have concluded gasoline engines of the type used in small automobiles which are mounted to the bed of the trailer and the like. It has been found that movement of the vessel causes misalignment of linkages which result in failures of the system. Also, prior pumping systems have been unwieldy, lacking compactness necessary for compatibility with moving cyrogenic vessels.

It would be an advance in the field of cryogenic fluid transfer to have an apparatus which solves all or some of these problems heretofore delineated.

SUMMARY OF THE INVENTION

In accordance with the present invention a novel and useful apparatus for transferring fluids is provided.

The apparatus of the present invention employs a motor which has a driven rotating shaft as its mechanical output. The motor may be of an electrical, hydraulic, or the genre, as desired. Where a hydraulic motor is used, flexible conduits may be included for directing movement of the hydraulic fluid for the purpose of operating the hydraulic motor.

Means may be provided for pumping the fluid, such as a centrifugal pump, which includes a driving rotating shaft as the mechanical output thereto. Means for transmitting the work of the rotating motor shaft to the pumping means rotating shaft is also encompassed by the present invention. Such means may take the form of fan belts, gears, or other known devices.

In addition, means for adjusting the distance between the motor shaft and the pumping means shaft is included. Such means may include a support for the motor and shaft as well as a support for the pumping means. Further, means for guiding movement between the motor and shaft support and the pumping means support is provided. The support for the motor and shaft may have a bottom, side portions connected around the bottom to form a mouth relative to the bottom. The support for the pumping means may include a pan having a bracket supported by the pan. The bracket provides a mount for the motor and shaft support above the bottom of the pan such that the mouth of the motor and shaft support is positioned over the pan. The bracket may be detachably fixed to the pan and have an upright member extending therefrom. The motor and shaft support could also include a lip which overlaps the upright member in the vicinity of the mouth of the motor and shaft support.

Means for guiding movement between the motor and shaft support and the pumping means support could take the form of at least a pair of slots placed in either the motor and shaft support or the pumping means support. A pair of pins are placed one in each slot and may be used to anchor any bearings supporting the motor shaft. Moreover, at least one member spanning both supports is employed to create a force therebetween. Such a member may take the form of a threaded bolt engaging portions of both supports and having the ability of being screwed inwardly or outwardly in relation to one or the other of these supports. Thus, the remaining support would be moved inwardly or outwardly with the screwing motion of the threaded bolt. The motor and shaft support or the pumping means support may be fastened to the container vehicle.

It may be apparent that a novel and useful apparatus for transferring fluids especially useful in cryogenic transportation is provided.

It is therefore an object of the present invention to provide an apparatus for transferring fluids which may easily accomodate the use of a hydraulic motor and a centrifugal pump.

It is another object of the present invention to provide an apparatus for transferring fluid which eliminates torque loads on the motor shaft bearings due to misalignment of the motor shaft and motor.

It is another object of the present invention to provide an apparatus for transferring fluids which is easy to repair and has the ability to incorporate different sized motors and pumps with small alterations to the linkage therebetween.

It is another object of the present invention to provide an apparatus for transferring fluids which has a system for capturing fluids which may escape or leak from its moving components.

The invention possesses other objects and advantages especially as concerns particular characteristics and features thereof which may become apparent as the specification continues.

For a better understanding of the invention reference is made to the following detailed description which should be references to the hereinabove described drawings.

DESCRIPTION OF THE PREFERRED EMBODIMENTS

Various aspects of the present invention will evolve from the following detailed description of the preferred embodiments thereof which should be taken in conjunction with the hereinabove described drawings.

Figure 1:
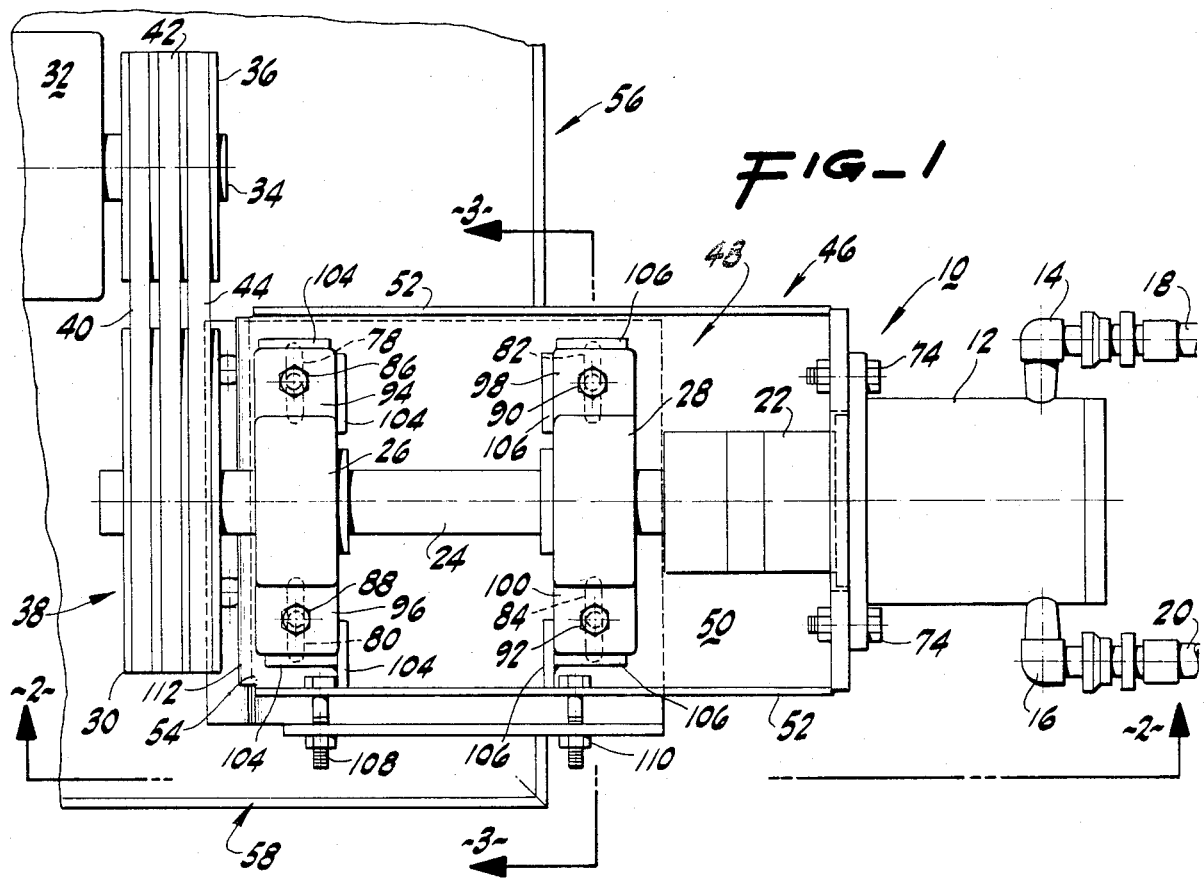
FIG. 1 is a broken top plan view of the apparatus of the present invention.
Figure 2:
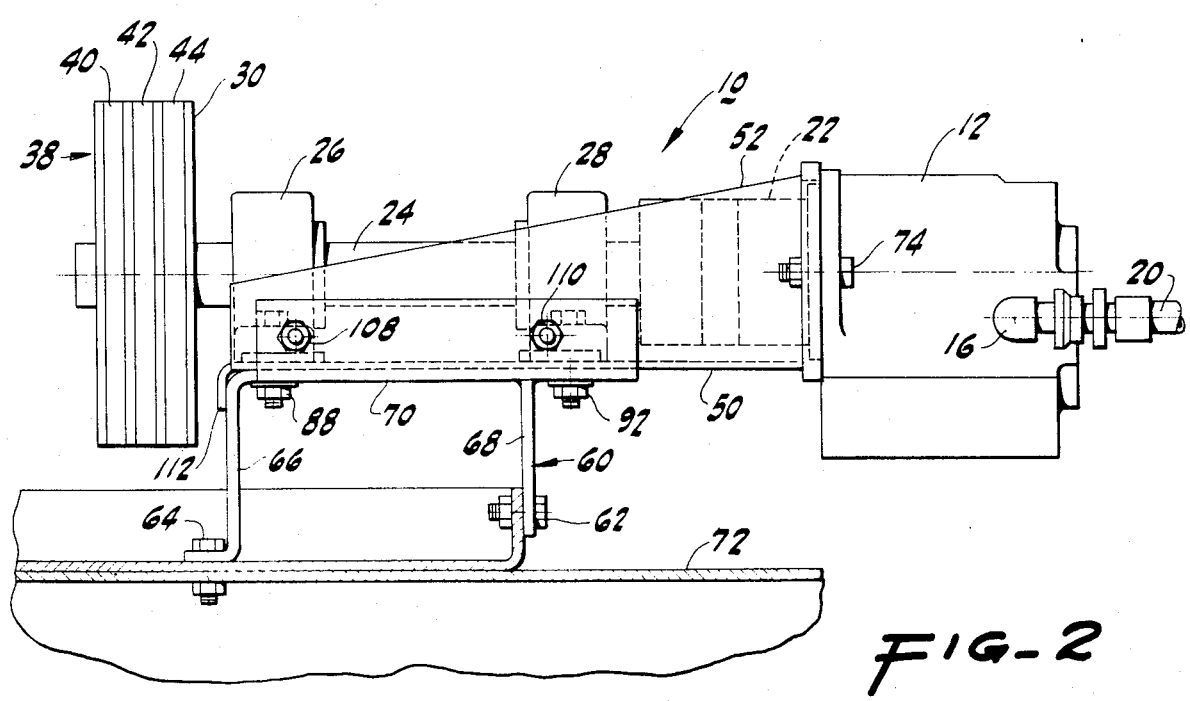
FIG. 2 is a view taken along line 2—2 of FIG. 1.
Figure 3:
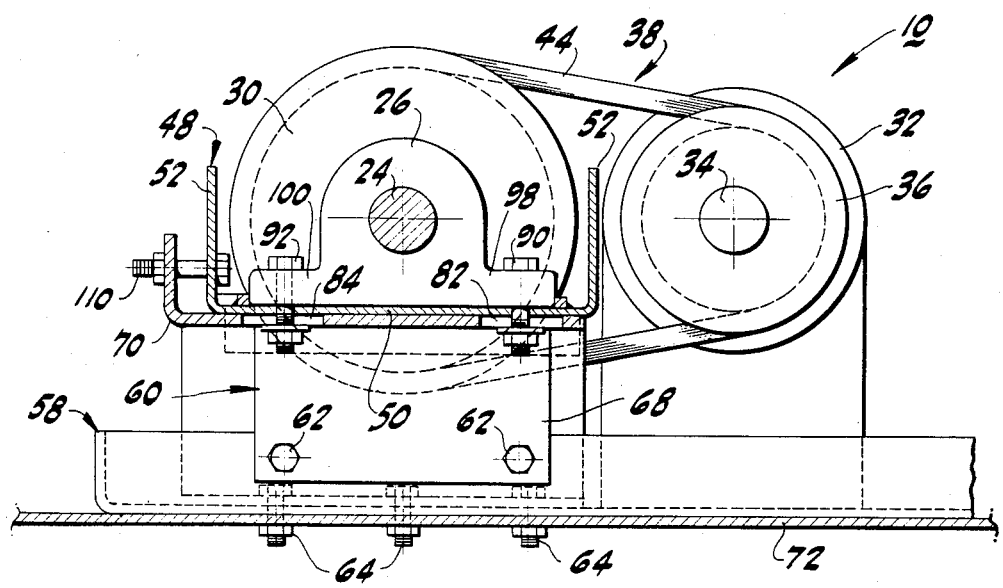
FIG. 3 is a view taken along line 3—3 of FIG. 1.

The apparatus as a whole is represented in the drawings by reference character 10. Apparatus 10 includes a motor 12 which is shown as being a hydraulic motor. Fittings 14 and 16 direct the flow of hydraulic fluid into motor 12 from flexible hoses 18 and 20. Motor 12 includes a coupling 22 having an output shaft 24 extending therefrom. Bearings 26 and 28 hold output shaft in alignment with motor and coupling 12 and 22. A pulley 28 locates on the outer extremity of shaft 24. Hydraulic pump 32 possesses a mechanical input shaft 34 which has a pulley 36 fixed thereto. Means 38 transmits the mechanical output in the form of work from rotating shaft 24 to shaft 34. Means 38 may be deemed to include pulleys 30 and 36 as well as fan belts 40, 42, and 44. As shown in FIGS. 1-3, means 38 also increases the rotational speed of shaft 34 in relation to shaft 24. It may be seen that changes in the size of pulleys 30 and 36 may be employed to match a particular motor 12 with any particular hydraulic pump 32.

Means 46 adjusts the distance between the shafts 24 and 34 to permit the proper tensioning of fan belts 40, 42, and 44, as well as replacement and repair of the same. Means 46 may take the form of a support 48 for motor 12 and shaft 24. Support 48 may take the form of a shallow container having a bottom 50 and side portions 52 forming mouth 54 at one end thereof. Support 48 may be a metallic material or of any other material suitable to support motor 12 and shaft 24. Support 56 holds pump means 32. Support 56 may include a pan 58 and a bracket 60 detachably connected thereto via fastening means 62 and 64, best shown in FIGS. 2 and 3. Bracket 60 includes upright members 66 and 68 as well as a plate 70 thereabove. Plate 70 fits beneathly under bottom 50 of support 48. It should be noted that support 56 fastens to a vehicle carriage or other base 72. Hydraulic motor 12 bolts to side portion 52 via fasteners 74.

Means 46 also includes means 76 for guiding movement between supports 48 and 56. Means 76 may include providing slots 78, 80, 82, and 84 through either support 48 or 56. As shown in the preferred embodiments, slots 78, 80, 82, and 84 are placed through support 56, more particularly plate 70 of bracket 60 thereof. Fasteners 86, 88, 90, and 92 in the form of bolts, washers and nuts, correspondingly fit into slots 78, 80, 82, and 84, and the openings in bottom 50 of support 48 as well. It may be seen that bearings 26 and 28 include flanges 94, 96, 98, and 100, which are also held by fasteners 86, 88, 90, and 92. A plurality of shoulders 104 and 106 at the periphery of bearings 26 and 28, aid in the alignment of the same in relation to motor shaft 24. Shoulders 104 and 106 are welded to bottom 50 of support 48. Fasteners 86, 88, 90, and 92 may be described as pins. Spanning members 108 and 110, in the form of bolts having nut engaging threaded portions, span supports 48 and 56. The tightening of the nuts of spanning members 108 and 110 create a force tending to bring supports 48 and 56 together. More specifically, the side portion 52 would be forced toward end 102 of bracket 60. Conversely, the loosening of the nuts of spanning members 108 and 110 would permit the separation of the side portion 52 and end 102. Thus, it may be seen that the movement between support 48 and bracket 60 of support 56 adjusts the distance between shafts 24 and 34. Such adjustment permits the repair or replacement of fan belts 40, 42, and 44, as well as the replacement of bearings 26 and 28 as necessary. The aligned shaft 24 and motor 12 remain so during the operation of apparatus 10 without further manipulation of the same.

In operation, the user fastens support 56 and pump means 32 to base 72. Support 48, specifically bottom 50, is placed over plate 70 of bracket 60 attached to support 56. Fasteners 86, 88, 90, and 92 are aligned with slots 78, 80, 82, and 84 respectively. Bearings 26 and 28 are placed within the confines of shoulders 104 and 106 such that the openings in flanges 96 and 98 thereof align with slots 78, 80, 82, and 84 as well as the openings in bottom 50, FIG. 3. Motor 12 is bolted to side portion 52 of support 48 and the hydraulic mechanism is connected to flexible hoses 18 and 20. Fan belts 40, 42, and 44 are placed on pulleys 30 and 36 about shafts 24 and 34 as desired. Spanning members 108 and 110 are then tightened to increase the tension of fan belts 40, 42, and 44 on the pulleys until no slipage occurs therebetween. Finally, fasteners 86, 88, 90, and 92 are tightened to secure the relative position between support 48 and support 56. This procedure is reversed to replace or repair the fan belts or bearings if required. Any fluids leaking from the bearings 26 or 28, shaft 24, or pump 32, will be corralled by the containers or pans formed in conjunction with supports 48 or 56. Lip 112 of bottom 50 aids in the alignment of supports 48 and 56 as well as directing any fluids into pan 58 of support 56.

While in the foregoing embodiments of the present invention have been set forth in considerable detail for the purposes of making a complete disclosure of the invention, it will be apparent to those of ordinary skill in the art that numerous changes may be made in such details without departing from the spirit and principles of the invention.

What is claimed is:

1. An apparatus for transferring fluid comprising:
   a. a motor having a rotating shaft as the mechanical output of said motor and a coupling located between said motor and said shaft;
   b. means for pumping the fluid including a rotating shaft as the mechanical input of said pumping means, said motor rotating shaft being spaced a selected distance from said pumping means rotating shaft;
   c. means for transmitting the work of said motor rotating shaft to said pumping means rotating shaft;
   d. means for adjusting the distance between said motor shaft and said pumping means shaft;
   said adjusting means including a motor and shaft support having a substantially horizontal bottom, upright side portions around said bottom forming an enclosure having a mouth;
   said motor rotating shaft including at least one bearing, said at least one bearing being fastened to said bottom of said motor and shaft support;
   said motor being connected to one of said side portions and positioned outside said enclosure, said coupling being connected to said one side portion and positioned inside said enclosure, said motor shaft extending through said enclosure for connection to said at least one bearing;
   said adjusting means further including a support for said pumping means and means for guiding movement between said motor and shaft support and said pumping means.

2. The apparatus of claim 1 in which said means for guiding movement between said motor and shaft support and said pumping means support includes at least a pair of slots selectively placed in said motor and shaft support and said pumping means support, a pair of pins placed in said slot, and at least one member spanning said supports including means for creating a force between said supports.

3. The apparatus of claim 2 in which said at least one member spanning said supports is a threaded member which selectively threadingly engages said supports.

4. The apparatus of claim 3 in which said means for transmitting the work of said motor rotating shaft to said pumping means rotating shaft comprises at least one endless loop frictionally engaging said shafts.

5. The apparatus of claim 4 in which said at least one bearing fastened to said bottoms of said motor and shaft support has at least one flange including an opening therethrough, said flange opening being sized to accomodate said any of said pair of pins.

6. The apparatus of claim 5 in which said motor comprises a hydraulic motor including at least one flexible conduit for directing the movement of hydraulic fluid for operating said hydraulic motor.

7. The apparatus of claim 1 in which said support for said pumping means includes a pan, and a bracket supported by said pan, said bracket providing a mount for said motor and shaft support above the bottom of said pan, said mouth of said motor and shaft support being positioned over said pan.

8. The apparatus of claim 7 in which said bracket includes means for detachably fixing said bracket to said pan.

9. The apparatus of claim 8 in which said bracket includes an upright member and said bottom of said motor and shaft support includes a lip which overlaps said upright member at said mouth of said motor and shaft support.

* * * * *